United States Patent
Namie et al.

(10) Patent No.: US 6,666,785 B1
(45) Date of Patent: Dec. 23, 2003

(54) TENSIONER

(75) Inventors: Tsutomu Namie, Osaka (JP); Kozo Inoue, Osaka (JP); Katsuya Nakakubo, Osaka (JP); Tadasu Suzuki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/721,025

(22) Filed: Nov. 22, 2000

(30) Foreign Application Priority Data

Nov. 26, 1999 (JP) .......................................... 11/336749

(51) Int. Cl.[7] ................................................. F16H 7/08
(52) U.S. Cl. ...................... 474/109; 474/101; 474/138
(58) Field of Search ............................... 474/110, 138, 474/103, 101, 109, 111, 136, 133, 135; 600/133, 159, 153

(56) References Cited

U.S. PATENT DOCUMENTS

| | | | |
|---|---|---|---|
| 3,574,418 A | * 4/1971 | Okabe | 267/34 |
| 4,300,890 A | * 11/1981 | Hallmann et al. | 474/110 |
| 4,708,696 A | * 11/1987 | Kimura et al. | 474/103 |
| 4,995,854 A | * 2/1991 | Ojima | 474/111 |
| 5,030,170 A | * 7/1991 | Ojima | 474/111 |
| 5,073,158 A | 12/1991 | Ojima | |
| 5,637,047 A | * 6/1997 | Schulze | 474/110 |
| 5,871,441 A | * 2/1999 | Ishiguro et al. | 600/133 |
| 5,913,742 A | * 6/1999 | Nakamura et al. | 474/110 |

FOREIGN PATENT DOCUMENTS

| | | |
|---|---|---|
| DE | 1 650 669 | 10/1970 |
| EP | 0 212 119 | 9/1990 |
| FR | 1.035.900 | 9/1953 |

* cited by examiner

Primary Examiner—Marcus Charles
(74) Attorney, Agent, or Firm—Dann, Dorfman, Herrell and Skillman; Henry H. Skillman

(57) ABSTRACT

A tensioner has a tensioner body and a plunger slidably mounted in a hollow cylindrical part of the tensioner body. A plug is screwed into a female or internal screw formed from one end of the hollow cylindrical part. A coil spring is loaded in a spring accommodating hole of the plunger and in a spring accommodating hole of the plug. The coil spring is a left hand spring. On the other hand, the direction of the plug being screwed into the tensioner body is right, which is opposite to the winding direction of the coil spring. Since the direction of the plug being screwed and the winding direction of the coil spring are different, when the plug is being screwed into the tensioner body with the coil spring held between the plug and the plunger, the coil spring slides on the bottom of the spring accommodating hole of the plunger or on the bottom of the spring accommodating hole of the plug without being caught at either end. Thus, the tensioner can be assembled very smoothly without producing powders by abrasion which may hinder smooth sliding movement of the plunger.

2 Claims, 2 Drawing Sheets

US 6,666,785 B1

TENSIONER

BACKGROUND OF THE INVENTION

1. Field of the Invention

The present invention relates to a tensioner that gives an appropriate tension to a timing chain or a timing belt of an engine.

2. Description of the Related Art

Of a tensioner that gives an appropriate tension to a timing chain or a timing belt of an engine, there is a type that gives a thrusting force to a plunger by using a compression coil spring. The tensioner of this type is comprised of a body having a hollow cylindrical part formed therein, a plunger engaged in one end of the hollow cylindrical part for sliding movement relative to the body, a plug screwed into the other end of the hollow cylindrical part, and a coil spring disposed between the plunger and the plug in an compressed condition.

In assembling the tensioner, the plunger is held in position against movement in a projecting direction by a pin, and the coil spring is then loaded inside the body. Thereafter, the plug is screwed into the body. When the plug is screwed, the coil spring is compressed, whereby the plunger is given a thrusting force.

However, in the conventional tensioner, the direction of the plug being screwed has been the same as the winding direction of the coil spring. For example, a right-winding coil spring has been used to a plug with a right handed screw, or a left winding coil spring has been used to a plug with a left handed screw.

When the plug and the coil spring are constructed in such a relation, as shown in detail in FIG. 3, and a plug 34 is screwed in to compress a coil spring 36, the plug 34 is caught on a coil edge 38. Accordingly, the assembling workability is extremely deteriorated. In addition, a buckling is likely to occur on the coil, resulting in a fracture of the coil spring 36. On the other hand, when the plug 34 is screwed, and the coil spring 36 turns with the rotation of the plug 34, there occurs the same phenomenon on the plunger side.

Further, when the plug 34 is screwed, the coil edge slides on the plug 34 or on the plunger under a high pressing-frictional force, which produces powders by abrasion. If the powders by abrasion come in on the sliding surface between the body and the plunger, a problem will occur that the plunger does not thrust outward when needed, or the friction on the sliding surface causes the plunger to vibrate, thus generating noises.

SUMMARY OF THE INVENTION

It is accordingly an object of the present invention to solve the foregoing problems associated with the prior art.

According to the present invention, there is provided a tensioner comprising: a body having a hollow cylindrical part formed therein; a plunger slidably engaged in one end of the hollow cylindrical part for sliding movement relative to the body; a plug screwed into the other end of the hollow cylindrical part of the body; and a coil spring disposed between the plunger and the plug for biasing the plunger in a direction away the plug, wherein a direction of the plug being screwed and a winding direction of the coil spring are different from each other.

When the plug is screwed in, the coil spring is gradually compressed to be strongly pressured to the plug and the plunger. In this instance, since the direction of the plug being screwed and the winding direction of the coil spring are made reverse, there do not occur virtually any catching phenomenon, and the buckling on the coil can be avoided. Therefore, the coil spring will not be broken, and the powders by abrasion will not be produced, which prevents the functional deterioration of the tensioner.

DETAILED DESCRIPTION OF THE PREFERRED EMBODIMENT

Figure 1:
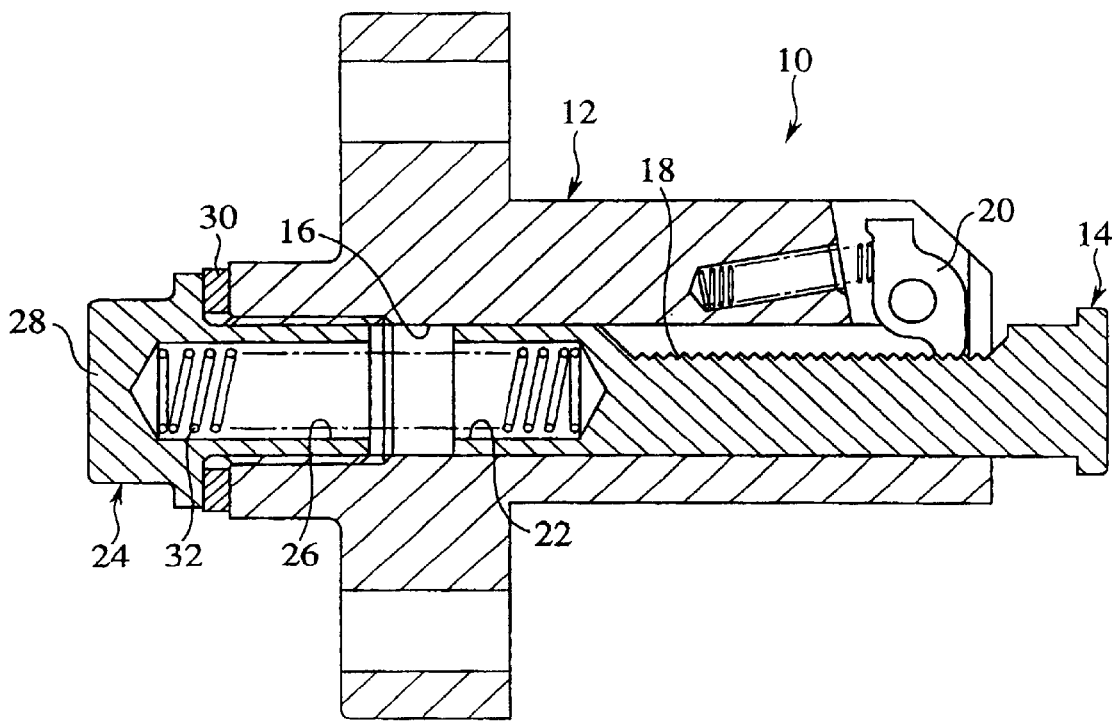
FIG. 1 is a sectional view of a tensioner according to an embodiment of the present invention.

The preferred embodiment of a tensioner according to the invention will be described with reference to the accompanying drawings. FIG. 1 is a sectional view of the tensioner. The tensioner 10 is used for giving an appropriate tension to a timing chain or a timing belt of an engine (neither shown). The tensioner 10 has a plunger 14 to which a thrusting force is applied from a tensioner body 12 fixed on an engine block or the like. The body 12 has a hollow cylindrical part 16 formed therein. The hollow cylindrical part 16 extends through the body 12 and has a smooth inner surface on one end (right side end in FIG. 1), and a female or internal screw (not designated) formed on the other end (left side end in FIG. 1).

The plunger 14 is inserted into the hollow cylindrical part 16 from the right end thereof so that the plunger 14 is freely slidable on the smooth inner surface of the hollow cylindrical part 16. The plunger 14 is made open toward the left end of the body 12, and has a cylindrical spring accommodating hole 22 formed concentrically with the hollow cylindrical part 16 of the body 12. The plunger 14 further has a rack 18 on a part of a smooth outer surface, and the rack 18 is engaged with a spring-loaded ratchet 20 rockingly attached to the body 12. The ratchet 20 prevents the plunger 14 thrust outward from moving back.

A plug 24 is screwed into the male screw formed on the left end of the hollow cylindrical part 16 of the body 12. The plug 24 has a male or external screw (not designated) formed on the outer surface of the plug 24 and engaged with the female screw (not designated) formed in the body 12. The plug 24 is made open toward one end of the body 12, and has a cylindrical spring accommodating hole 26 that is formed concentrically with the hollow cylindrical part 16 of the body 12. The spring accommodating hole 26 has the same inside diameter as that 22 in the plunger 14. The plug 24 has a head 28 with the diameter expanded, and a shim or a washer 30 is inserted and pinched between the enlarged head 28 and the other end face of the body 12.

The tensioner 10 also has a compressed coil spring 32 that gives a thrusting force to the plunger 14. The coil spring 32 is loaded in the spring accommodating hole 22 of the plunger 14 and in the spring accommodating hole 26 of the plug 24. The outer diameter of the coil spring 32 is made slightly smaller than the inside diameter of the spring accommodating holes 22, 26. The coil spring 32 has one end held in contact with the bottom of the spring accommodating hole 22 of the plunger 14, and the other end held in contact with the bottom of the spring accommodating hole 26 of the plug 24.

Figure 2:
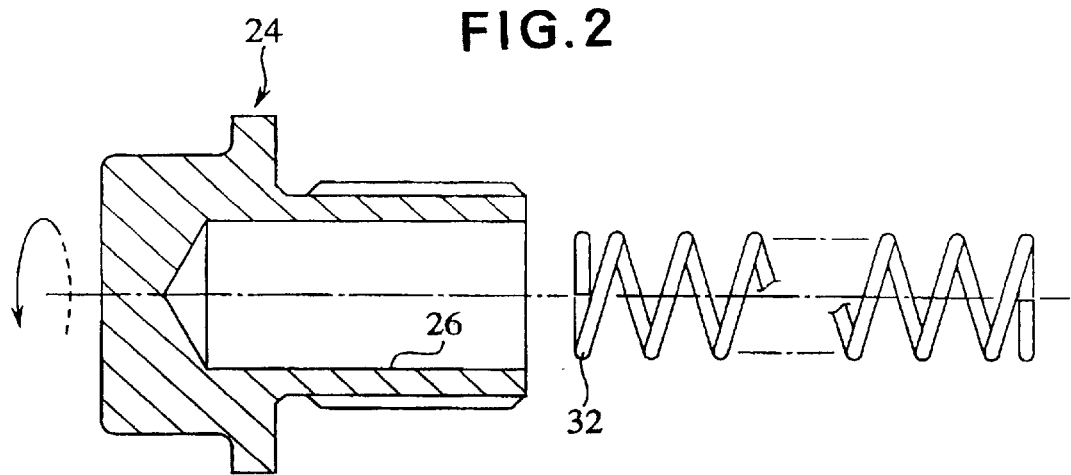
FIG. 2 is a front view explaining the relation of a plug and a coil spring of the tensioner shown in FIG. 1.

As shown in detail in FIG. 2, the coil spring 32 is a left handed spring. On the other hand, the direction of the plug 24 being screwed into the body 12 is right. Thus, the winding direction of the coil spring 32 is different from the direction of the plug 24 being screwed. Incidentally, it may be designed such the coil spring 32 is a right handed spring, and the direction of the plug 24 being screwed into the body 12 is left.

In the tensioner 10, the plunger 14 is engaged in the hollow cylindrical part 16 of the body 12, the coil spring 32 is loaded in the respective spring accommodating holes 22, 26 of the plunger 14 and plug 24, and the plug 24 is screwed into the hollow cylindrical part 16 of the body 12. As the plug 24 is screwed, the coil spring 32 is gradually compressed, and the ends of the coil spring 32 are brought into firm contact with the bottoms of the spring accommodating holes 22 and 26 of the plunger 14 and the plug 24.

In the embodiment of this invention, since the direction of the plug 24 being screwed and the winding direction of the coil spring 32 are different, the coil spring 32 is rarely caught during sliding on the bottom of the spring accommodating hole 22 of the plunger 14, or on the bottom of the spring accommodating hole 26 of the plug 24. This facilitates the assembly work.

Figure 3:
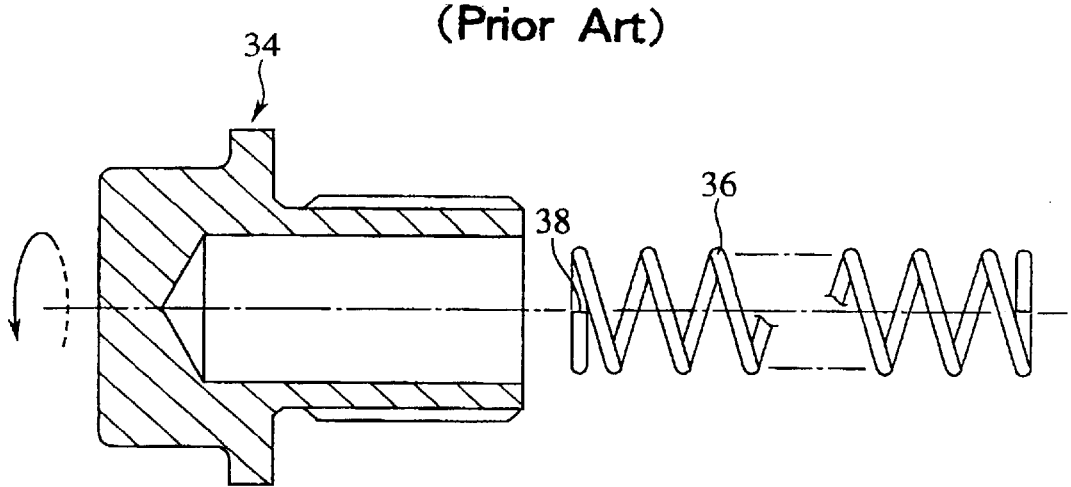
FIG. 3 is a front view explaining the relation of a plug and a coil spring of a conventional tensioner.

Specially, when the coil spring 32 is cut perpendicularly to the direction of coiling as shown in FIG. 2, if the direction of the plug 24 being screwed and the winding direction of the coil spring 32 are the same as in the conventional tensioner such as shown in FIG. 3, the coil spring 32 creates a buckling by a catch, or the coil spring 32 produces powders by friction; however as in the invention, since the direction of the plug 24 being screwed and the winding direction of the coil spring 32 are different, the plug 24 can smoothly screwed in without a catch on either end of the coil spring 32. Accordingly, the friction powders will not substantially be produced which would otherwise prevent smooth projecting and retracting operations of the plunger 14.

As the invention being thus described, in a tensioner having a plug being screwed to thereby give a compression to the coil spring, since the direction of the plug being screwed and the winding direction of the coil spring are made different, the plug and plunger do not have catches on the ends of the coil spring, thus improving the assembling workability of the plug.

Further, since the plug and plunger do not have catches on the ends of the coil spring, a buckling or a fracture of the coil, which may be created when the plug is screwed in, can be prevented. In addition, since the friction powders are not substantially produced owing to the prevention of catches, the sliding face between the body and the plunger is free from the friction powders. This enhances the response of the plunger.

Obviously, various minor changes and modifications of the present invention are possible in the light of the above teaching. It is therefore to be understood that within the scope of the appended claims, the present invention may be practiced otherwise than as specifically described.

What is claimed is:

1. A tensioner comprising:

a body having a hollow cylindrical part formed therein having one end for receiving a plunger and another end having threads of one direction for receiving a screw plug;

a plunger slidably engaged in said one end of the hollow cylindrical part for sliding movement relative to the body;

a ratchet mounted on said body an engaging one side of said plunger to provide unidirectional movement of said plunger outwardly of said hollow cylindrical part;

a plug having threads of the same direction as said cylindrical part threads, said plug being screwed into said other end of the hollow cylindrical part of the body; and a coil spring disposed between the plunger and the plug for biasing the plunger in a direction away from the plug to apply tension, said coil spring having a winding direction which is different from said thread direction and having a coil end edge at the end engaging the plug so as to face opposite the direction of rotation of the plug when screwed into said body, so as to allow rotation of said plug relative to said spring by avoiding catching the end edge of the spring on the plug during screwing in of the plug, and avoid producing powder by friction, or buckling or fracture of the coil due to catching of the spring during compression of the spring in assembly.

2. A method of assembling a tensioner having a plug and a spring to avoid producing powder by friction, or buckling or a fracture of the spring due to catching of the spring on the plug during compression of the spring comprising the steps of providing:

a body having a hollow cylindrical part formed therein having one end for receiving a plunger and another end having threads of one direction for receiving a screw plug;

a plunger slidably engaged in said one end of the hollow cylindrical part for sliding movement relative to the body;

a plug having threads of the same direction as said cylindrical part threads, said plug being configured to be screwed into the other end of the hollow cylindrical part of the body; and a coil spring disposed between the plunger and the plug for biasing the plunger in a direction away from the plug to apply tension, said coil spring having end edges and a winding direction which is different from said thread direction; and assembling the tensioner with one of said coil end edges engaging the plug, and screwing the plug into the body to compress the spring, so that said different winding direction allows rotation of said plug relative to said spring and avoiding catching the one end edge of the spring on the plug during screwing of the plug, thereby avoiding producing powder by friction, or buckling or fracture of the coil spring.

* * * * *